UNITED STATES PATENT OFFICE.

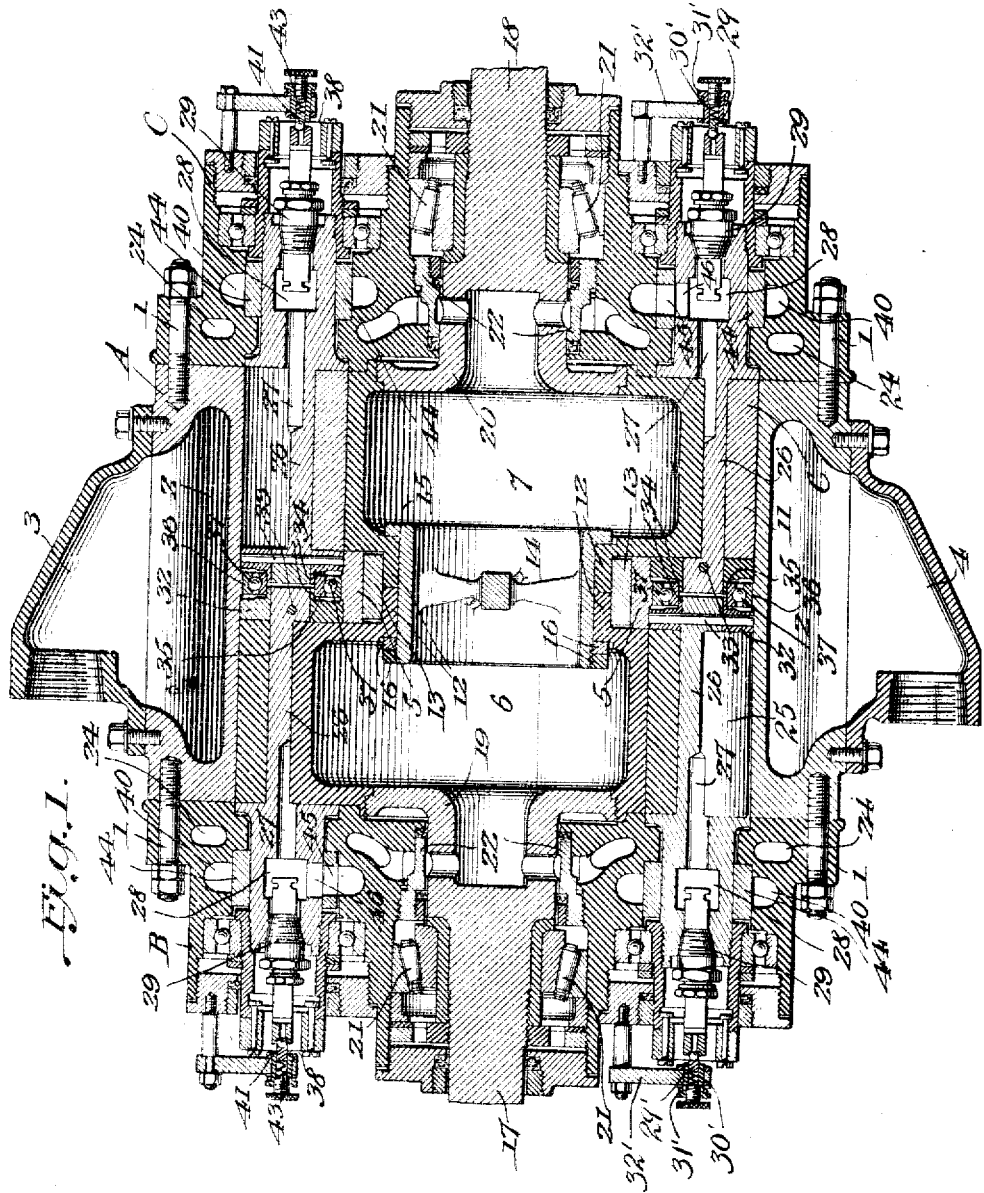

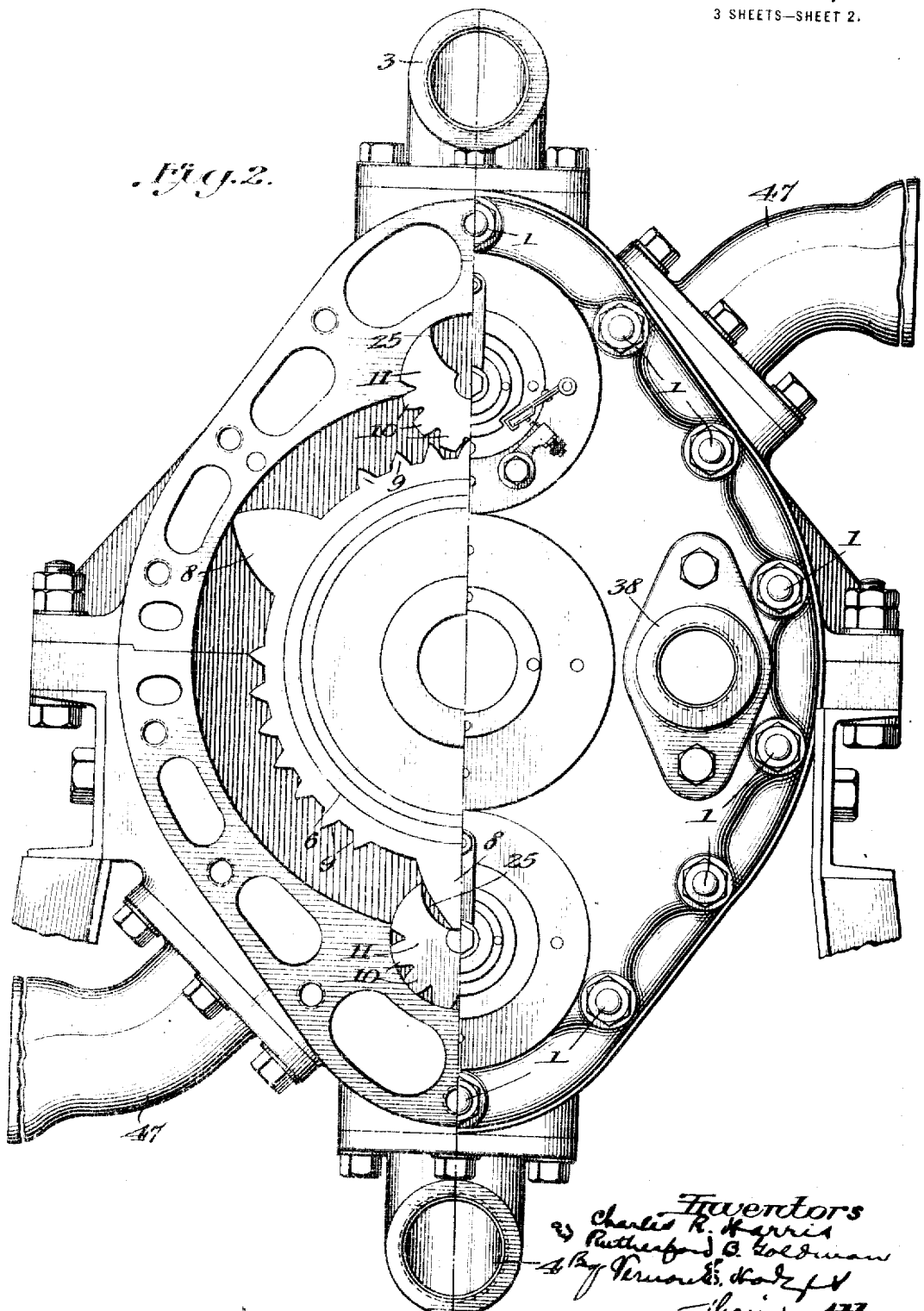

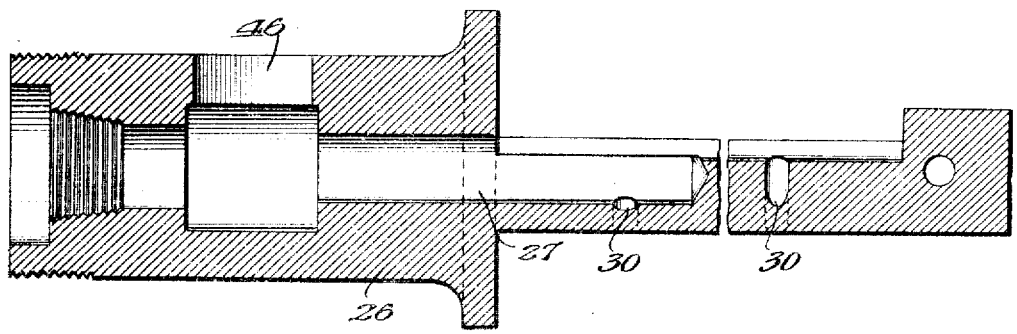
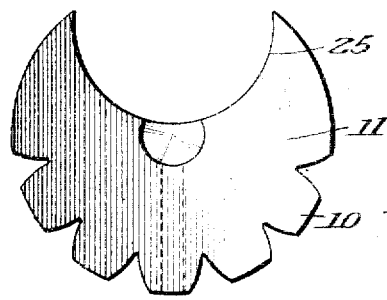
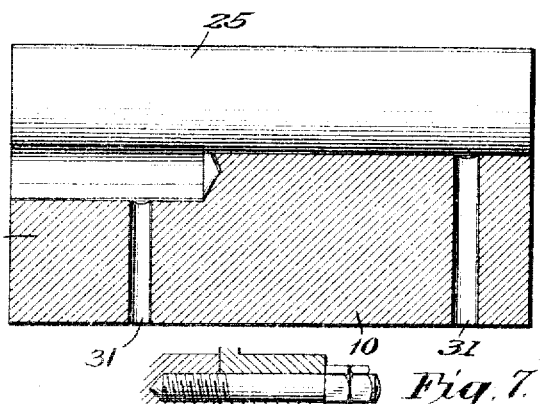
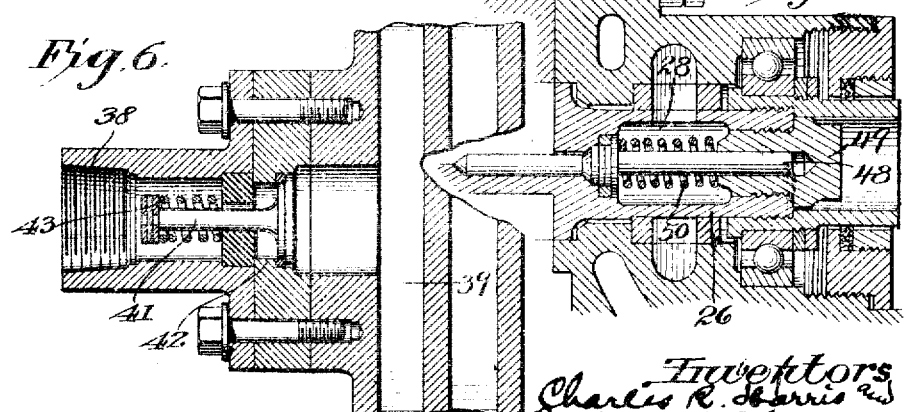

CHARLES R. HARRIS AND RUTHERFORD G. GOLDMAN, OF LOS ANGELES, CALIFORNIA.

ROTARY MOTOR.

1,268,794.  Specification of Letters Patent.  Patented June 4, 1918.

Application filed February 21, 1916. Serial No. 79,752.

*To all whom it may concern:*

Be it known that we, CHARLES R. HARRIS and RUTHERFORD G. GOLDMAN, citizens of the United States, residing at Los Angeles, in the county of Los Angeles and State of California, have invented certain new and useful Improvements in Rotary Motors, of which the following is a specification.

This invention relates to an improvement in rotary motors, and the object is to provide means for causing the rotation of the rotary members by the explosion of an explosive mixture.

A further object is in the provision of means for conducting the propelling medium to the rotary abutments, so that the medium will cause the runner or rotor to be rotated.

The invention relates to still other novel features of construction and combinations of parts which will be hereinafter more fully described and pointed out in the claims.

In the accompanying drawings:

Figure 1 is a longitudinal vertical sectional view;

Fig. 2 is an end view with a portion of the end plate removed to show the location of the interior;

Fig. 3 is a longitudinal sectional view of the spindle on which the cylinder head or rotary abutment is mounted;

Fig. 4 is a sectional view through the rotary abutment;

Fig. 5 is an end view;

Fig. 6 is a detail sectional view through the valve mechanism located in the intake openings;

Fig. 7 is a detail sectional view of a check valve which is substituted for the spark plugs when the apparatus is used as a compressor.

A represents the cylinder or casing, which is preferably cylindrical in form, and B and C are the end members. The end members are connected to the central member or cylinder A by means of screw bolts 1, 1.

The central member is provided with passages 2 for the circulation of water for maintaining the cylinder in a cool condition and at the upper side of the casing, an inlet hood 3 is connected, and at the lower side an outlet hood 4 is connected to the casing. An annular flange 5 is formed on the inner surface centrally of the cylinder A.

Journaled in the cylinder are the twin rotors 6 and 7, each being provided with pistons 8 on the outer surface thereof. The pistons on the member 6 are located practically midway between the pistons on the member 7. In other words, the pistons on the two runners are not in direct longitudinal alinement, but are practically parallel to each other longitudinally of the runner, the object being that when an impulse is imparted to a piston of the member 6, an impulse will not be imparted to a piston of the member 7. Each rotor is provided with teeth 9, which are adapted to mesh with the teeth 10 on the rotary abutment 11. Each member 6 and 7 is provided with an inwardly-extending flange 12. These flanges are adapted to abut and rest upon a ring 13 which is mounted upon the annular flange 5 of the casing.

A connector 14, consisting of a hollow body provided with an integral flange 15, is received within the annular flanges 12 of the members 6 and 7, and the flange 15 engages the inner surface of the flange 12 of one of the members. The other terminal of the connector 14 is provided with external screw-threads, upon which nuts 16 are screwed, and are caused to engage the flange 12 of the member 6 for locking the two members together, so that the members will rotate as a unit.

Journaled in the end members B and C are shafts 17 and 18. These shafts are each provided at their inner ends with flange heads 19, and 20 respectively, which have screw-threaded engagement with the ends of the rotary members 6 and 7 respectively. The shafts 17 and 18 are supported in the ends B and C on roller bearings 21, 21.

A packing gland 22 is received around the shafts, and is connected to the ends B and C. These glands are provided with openings for registering with the passages 24 in the ends B and C.

The shaft 18 is of greater length than the shaft 17, and is adapted to receive a pulley or other means (not shown) for transmission of power. The abutments 11 are provided with recesses 25, through which pistons travel as the pistons of the rotary members pass the abutments.

The abutments are carried on spindles 26. Each spindle is journaled in one of the end members B and C, and a portion of the spindle is fitted to the abutment, so that the upper surface of the spindle registers with the curvature of the recesses 25 of the abutment.

The spindle is provided with a central bore or passage 27, which extends about half the length of the rotating abutment. A sparking chamber 28 is formed in the spindle, communicating with the bore 27. A spark plug 29 is screwed into the end of the spindle, and an end of the plug is received in the spark chamber 28. The outer end of each spark-plug is countersunk to receive a pin 29' seated therein by means of a spring 30' arranged in the bushing 31 carried by the arm 32' supported on the end members B and C. The rotary abutment is fastened to the spindle by means of pins (not shown) passing through the openings 30, 30 in the spindles and the openings 31, 31 in the rotary abutment. The inner terminals of the spindle 26, which are connected to the adjacent abutments, are supported in collars 32, and are connected thereto by means of pins 33 passing through collars and ends of the spindles. This connection securely fastens the rotary abutments upon the spindles. The collars 32 are provided with external hubs 34, upon which a ring 35 is mounted. Surrounding this ring 35 is a similar ring 36.

Interposed between the two rings are balls 37 for forming an anti-friction bearing. The ends of the spindles 26 are received in openings formed in the annular flange 5 of the cylinder or casing A, and the outermost ring 36 is received within and fits the openings formed in the flange 5. In each of the end members and on opposite sides of the shafts 17 and 18 are located intake openings 38. Each inlet opening has communication by means of the passage 39 with the inletting chambers 40. In the inlet opening, a valve 41 is normally seated upon the valve seat 42 by means of the spring 43. The inlet opening is connected with a suitable source of supply of oil and compressed air, which is introduced in the proper condition, as in the form of a spray, that is, the air and oil are passed through a suitable atomizing means (not shown) in which fuel will be atomized, and after the fuel has been atomized, it will be delivered through the inlet opening under suitable pressure, and into the inletting chambers 40. Surrounding each of the spindles at the inletting chambers 40 is a bushing 44, which is provided with an elongated slot 45 through which slot the explosive mixture or fuel is admitted to the sparking chamber 28 through an orifice or elongated slot 46 in the spindle. The spark plugs are connected to a suitable timing mechanism, so that when the fuel is admitted to the chambers 28, and which is governed by the spindles, as the orifice or slot 46 will admit and cut off the supply of fuel thereto, as it passes the slot 45 in the ring, an explosion will take place, which together with the expansion of the mixture, upon passing through the passage 27 into the recesses 25 of the rotary abutment 11 will impart a force to one of the pistons of one of the twin rotors, as it is passing through the cylinder head, whereby the rotor or runner will be rotated. The exhaust will be discharged from the casing through the openings 47, 47 formed in the casing, and which are adjacent to the cylinder heads, that is, the pistons after an explosion will force the exhaust gases from the cylinder or casing through the openings 47 prior to the pistons entering the recess of the cylinder head.

The operation of inletting, exploding, and expanding is accomplished as each piston passes through the recess of the rotary abutment 11, and a total of twelve expansions are had to each revolution of the runner.

By removing the spark plug 29 and timing apparatus (not shown) the machine may be used as a rotary fluid compressor. The valve seat 42, valve 41, and spring 43 are omitted from the inlet openings 38, and substituted for the spark plug 29 is a check valve 48 which is seated in the spindle 26, and incloses the forward end of the chamber 28. The stem of the valve 48 is seated in a recessed nut 49, which has screw-threaded engagement with the end of the spindle 26. A spring 50 surrounds the valve stem for normally holding the valve seated. When the apparatus is used as an air compressor, the air enters through the exhaust openings 47 into the cylinder or casing A, where the air will be compressed by the pistons against the cylinder heads, and forced through the recesses of the abutments 11 through the passage 27 of the spindles 26 against the valve 48. When the pressure has been raised to a certain degree, the valve will be opened, and the fluid is permitted to enter the chamber 28, and from thence will pass into the chamber 40 and out through the inletting opening 38 to any suitable retainer.

We claim:

1. In a rotary motor, the combination with a casing having rotary abutments therein provided with recesses, of a runner rotatably mounted in the casing having pistons, the pistons being adapted to enter the recesses in passing the abutments, spindles journaled in the casing and upon which the abutments are mounted, said spindles being provided with passages which communicate with the recesses of the abutments through which a fluid may pass, and stationary means on the spindle for controlling the flow of fluid through the passages.

2. The combination with a casing having abutments therein, said abutments being provided with recesses, of a runner mounted in the casing and provided with pistons which are adapted to enter the recesses of the abutments in passing the abutments, spindles journaled in the casing and forming supports for the abutments, said spindles having communication with the recesses of the abutments for delivering a fluid to the recesses of the abutments, means for controlling the admission of fluid to the spindles, and means carried by the spindles for igniting the fluid.

3. The combination with a casing having a runner and abutments rotatably mounted therein, pistons mounted on the runner and recesses formed in the abutments in which the pistons enter as they pass an abutment, rotary spindles mounted in the casing and forming supports for the abutments, said spindles having explosion chambers which are in communication with the recesses of the respective abutments, and means for causing an explosive agent to be ignited in said spindles.

4. The combination with a casing having two chambers, a runner mounted in each chamber having pistons thereon, and arranged in staggered relation, said runners rotating in unison, rotary abutments mounted in each chamber of the casing and having recesses therein, spindles forming the support for the abutments, said spindles being provided with explosive chambers which have communication with the recesses of the abutments, means for causing an explosion of an explosive agent in the spindles, said casing having exhaust ports formed in the wall thereof through which the exhaust gases are discharged from the two chambers.

5. In a rotary motor, the combination with a casing and end members, spindles journaled in the end members, a casing having passages therein, abutments mounted on the spindles provided with recesses in communication with passages of the spindles, runners mounted in the casing having pistons thereon adapted to enter the recesses of the abutments as the pistons pass the abutments for receiving an impelling force for causing the runners to rotate, inlet chambers in communication with the passages of the spindles, means for introducing a combustible material to said inlet chambers, and means carried by the spindles for igniting the combustible material within the spindle.

6. In a rotary motor, the combination with a casing and end members, spindles journaled in the end members, and having passages therein, abutments mounted on the spindle provided with recesses in communication with passages of the spindles, runners mounted in the casing having pistons thereon adapted to enter the recesses of the abutments as the pistons pass the abutments for receiving an impelling force for causing the runners to rotate, inlet chambers in communication with the passages of the spindles, means for introducing a combustible material to said inlet chambers, means carried by the spindles for igniting the combustible material within the spindle, and means for controlling the admission of explosive mixture to said spindles.

In testimony whereof we affix our signatures, in the presence of two witnesses.

CHARLES R. HARRIS.
RUTHERFORD G. GOLDMAN.

Witnesses:
E. D. FOSTER,
A. C. THOMSON.